United States Patent
Kim

(10) Patent No.: US 7,421,263 B2
(45) Date of Patent: Sep. 2, 2008

(54) CIRCUIT FOR REDUCING SECOND ORDER INTERMODULATION

(75) Inventor: Woonyun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 538 days.

(21) Appl. No.: 11/013,092

(22) Filed: Dec. 15, 2004

(65) Prior Publication Data

US 2005/0143044 A1  Jun. 30, 2005

(30) Foreign Application Priority Data

Dec. 30, 2003 (KR) .................. 10-2003-0100134

(51) Int. Cl.
*H04B 1/26* (2006.01)
(52) U.S. Cl. .................. 455/234.1; 455/318; 455/323
(58) Field of Classification Search ............. None
See application file for complete search history.

(56) References Cited

U.S. PATENT DOCUMENTS

| | | | |
|---|---|---|---|
| 3,940,703 A | 2/1976 | Hekimian et al. | |
| 5,930,696 A | 7/1999 | Tzuang et al. | |
| 6,242,963 B1 | 6/2001 | Su et al. | |
| 6,316,996 B1 | 11/2001 | Puotiniemi | |
| 6,438,365 B1 | 8/2002 | Balteanu | |
| 6,535,725 B2 | 3/2003 | Hatcher et al. | |
| 2003/0129958 A1 | 7/2003 | Behzad | |
| 2006/0148438 A1* | 7/2006 | Manku | .................. 455/313 |

FOREIGN PATENT DOCUMENTS

| | | |
|---|---|---|
| KR | 00204591 | 3/1999 |
| KR | 2002-0033978 | 5/2002 |
| WO | WO 02/33812 | 4/2002 |

OTHER PUBLICATIONS

Baker, Jacob R., Li, Harry W., Boyce, David E. "CMOS Circuit Design, Layout, and Simulation," IEEE, ISBN 0-7803-3416-7, 1998, pp. 666-668.

* cited by examiner

*Primary Examiner*—Thanh C Le
(74) *Attorney, Agent, or Firm*—F. Chau & Associates, LLC

(57) ABSTRACT

A circuit for calibrating a second order intercept point (IP2) and for reducing second order intermodulation (IM2) includes a common mode feedback circuit and a load impedance operatively connected between first and second output terminals of a mixer in a direct conversion receiver. The common mode feedback circuit reduces second order intermodulation of the mixer by detecting an output voltage of the mixer and adjusting a gain of the mixer. The IP2 is controlled by controlling the gain of the common mode feedback circuit. The second order intermodulation (IM2) may be reduced and the linearity of a device may be enhanced.

20 Claims, 4 Drawing Sheets

CIRCUIT FOR REDUCING SECOND ORDER INTERMODULATION

CROSS REFERENCE TO RELATED APPLICATION

This application claims priority under 35 USC § 119 to Korean Patent Application No. 2003-100134, filed on Dec. 30, 2003, the contents of which are herein incorporated by reference in its entirety for all purposes.

BACKGROUND OF THE INVENTION

1. Field of the Invention

The present invention relates to radio frequency (RF) communication systems and, more particularly, to a circuit for controlling a second order intercept point (IP2) in a mixer of a direct conversion receiver.

2. Description of the Related Art

In a receiver employing a superheterodyne architecture, a third order intermodulation (IM3) is significant. When a carrier signal is modulated into a baseband signal of a desired frequency band to be transmitted or received, non-linearity of a device (e.g., mixer) with multiple input frequencies causes undesired output frequencies that are different from the input frequencies. The input signals having two or more frequencies are mixed together produce distortion, i.e. an intermodulation distortion (hereinafter, referred to as IMD), having additional undesired frequencies. When input signals having two input frequencies pass through a non-linear device, intermodulation (hereinafter, referred to as IM) components are generated. The IMD is caused by the IM components. The IM components have frequencies corresponding to the sum of the two input frequencies and the difference between the two input frequencies. Thus, when two input signals having two different input frequencies are applied to the non-linear device, the IMD causes interference with modulation and demodulation.

When the frequency of the carrier signal is converted to an intermediate frequency (IF) in a superheterodyne conversion process, a third order IMD can occur at baseband frequencies and thus cannot be easily filtered out. Direct conversion (also called zero-IF or homodyne) is a special case of the superheterodyne receiver. In this case, the local oscillator LO is set to the same frequency as the desired RF channel. That means that the IF is zero, or dc. Now the filtering and gain can take place at dc, where gain is easier to achieve with low power. The basic operation of a direct-conversion receiver can be described as mixing an input signal frequency of $(f_{RC}+\Delta)$, where ($\Delta$) is the bandwidth of the modulation, with a local oscillator at $f_{LO}$, yielding an output at: $f_{MIXOUT}=(f_{RF}+\Delta-f_{LO})$ and $(f_{RF}+\Delta+f_{LO})$. In a conventional superheterodyne receiver, second-order distortion terms usually fall out of band and can be easily filtered. However, in a direct-conversion receiver, even-order distortion, particularly second-order products, will cause in-band interference.

In a direct conversion receiver, the received carrier signal is directly down-converted to the baseband signal, and so a second order IMD occurs at baseband frequencies. Thus, in the direct conversion receiver, the second order IMD has more effect on a signal distortion than the third order IMD, and accordingly there is a need for adjusting the second order IMD to prevent the signal distortion.

The theoretical point where the linear extension of the second order IMD intersects the linear extension of an input signal is referred to as a second order intercept point (IP2). The IP2 is an important parameter used to characterize a radio frequency (RF) communication system, and represents the total non-linearity of the communication system. As the value of the intercept point increases, the device has less non-linearity.

As the power level of the input signal is increased, the power level of the second order IMD at the output is also increased, and the point where the power level of the second order IMD intercepts the original power level of the input signal represents the IP2. However, since the output power is generally saturated before the output power reaches a theoretical IP2 point, a real IP2 point corresponds to only an expected hypothetical output power level where the second order IMD is expected to reach the same amplitude level as the input power level.

The linearity of the communication system may be increased by achieving a high IP2, which reduces the second order IMD (IM2). In general, a mixer in a direct conversion receiver has an IP2 calibration circuit for adjusting the IP2.

FIG. 1 is a circuit diagram illustrating a conventional second order intercept point (IP2) calibration circuit.

Referring to FIG. 1, the IP2 calibration circuit includes a mixer 100 and an IP2 modulator 102. The conventional IP2 calibration circuit of FIG. 1 is described by K. Kivekas et al., in "Calibration techniques of active BiCMOS mixers", IEEE J. Solid-State Circuits, June 2002, Vol. 37, pp. 766-769, which is incorporated herein by reference in its entirety.

The mixer 100 includes a first pair of input terminals 104 for receiving a carrier signal $V_{RF}$ and a second pair of input terminals 106 for receiving a local oscillation signal $V_{LO}$. The mixer 100 outputs a frequency difference (e.g., $f_{RF}+\Delta-f_{LO}$) between the frequency of the carrier signal $V_{RF}$ and the frequency of the local oscillation signal $V_{LO}$. The output signal of the mixer 100 is output to a pair of output terminals 108.

The IP2 controller 102 includes load resistors RLP, RLN and a calibrating resistor Rcal. The calibrating resistor Rcal is connected in parallel to the load resistors RLP and RLN. The calibrating resistor Rcal compensates for a mismatch between differential outputs $V_{op}$ and $V_{on}$ of the mixer 100. A total second order intermodulation (IM2) output voltage is obtained by summing up the IM2 output voltage in a common mode and the IM2 output voltage in a differential mode.

The IM2 output voltage $V_{IM2,cm}$ in the common mode is given by the following expression 1:

$$V_{IM2,cm}=i_{cm}(R+\Delta R-Rc)-i_{cm}(R-\Delta R)=i_{cm}(2\Delta R-Rc), \quad \text{<Expression 1>}$$

wherein RLN is represented by $(R-\Delta R)$, and Rc denotes a decrease in the resistance value of RLP (e.g. $R_{LP}=R+\Delta R$) due to Rcal, and $i_{cm}$ represents a current in a common mode.

The IM2 output voltage $V_{IM2,dm}$ in the differential mode is given by the following expression 2:

$$V_{IM2,dm}=i_{dm}(R+\Delta R-Rc)+i_{dm}(R-\Delta R)=i_{dm}(2R-Rc), \quad \text{<Expression 2>}$$

wherein RLN is represented by $(R-\Delta R)$, and Rc represents a reduction of the resistance value of RLP (e.g. $R_{LP}=R+\Delta R$) due to Rcal, and $i_{dm}$ represents a current in a differential mode.

Therefore, the total IM2 output voltage $V_{IM2}$ is given by the following expression 3:

$$V_{IM2}=V_{IM2,cm}+V_{IM2,dm}=i_{dm}(2R-Rc)+i_{cm}(2\Delta R-Rc). \quad \text{<Expression3>}$$

The second order intercept point (IP2) is calibrated by adjusting Rc (e.g., by changing Rcal), to change (e.g., to reduce) $V_{IM2}$. The use of the above-mentioned calibration-method (using the resistor Rcal) has limitations in a semiconductor manufacturing process. Since $\Delta R$ is in a range of from about 0.1% to 10% of R, Rc is also in a range of from about 0.1% to 10% of R. Therefore, the Rcal needs to be ten times to thousand times as large as the resistance of R. Thus, when R is tens of KΩ, Rcal needs to be tens of MΩ. Therefore, it is difficult to implement Rcal in a semiconductor manufacturing process, since a considerably large resistor occupies a large area on a semiconductor substrate and additional logic circuits are required. In addition, when the resistive load is used in IP2 calibration, a sufficient voltage margin may not be acquired in a structure where a high gain and linearity is required.

SUMMARY OF THE INVENTION

The present invention is directed to a circuit for calibrating a second order intercept point (IP2) to control second order intermodulation (IM2), and provides an enhanced linearity of a device (a direct conversion receiver) with a small on-chip area. In accordance with an embodiment of the present invention, the IP2 calibration circuit includes a common mode feedback circuit and a load impedance operatively connected to first and second output terminals of a mixer. The mixer directly converts a carrier signal to a baseband signal. The common mode feedback circuit controls the second order intermodulation of the mixer by detecting at least one output voltage of the mixer and by adjusting a gain of the common mode feedback circuit. The load impedance is disposed between the first and second output terminals of the mixer for controlling a small signal gain of the mixer.

Various embodiments of the invention provides circuits for calibrating a second order intermodulation, the circuit comprising: a common mode feedback circuit configured to control the second order intermodulation of a mixer by detecting at least one output voltage of the mixer and by adjusting the gain of the common mode feedback circuit; and a load impedance for connection between a first output terminal and a second output terminal of the mixer.

Other embodiments of the invention provide a direct conversion receiver comprising: a mixer having a first output terminal and a second output terminal; a load impedance connected between the first output terminal and a second output terminal; a first transistor connected between a supply voltage and the first output terminal and a second transistor connected between the supply voltage and the second output terminal.

According to the present invention, the second order intermodulation (IM2) may be reduced so as to enhance the linearity of a radio frequency (RF) device.

BRIEF DESCRIPTION OF THE DRAWINGS

The present invention will become understood by those of ordinary skill in the art by describing, in detail, exemplary embodiments thereof with reference to the attached drawings, wherein like elements are represented by like reference numerals, and which are provided for illustration only and thus do not limit the scope of the present invention.

DETAILED DESCRIPTION OF THE EXEMPLARY EMBODIMENTS

Figure 1:
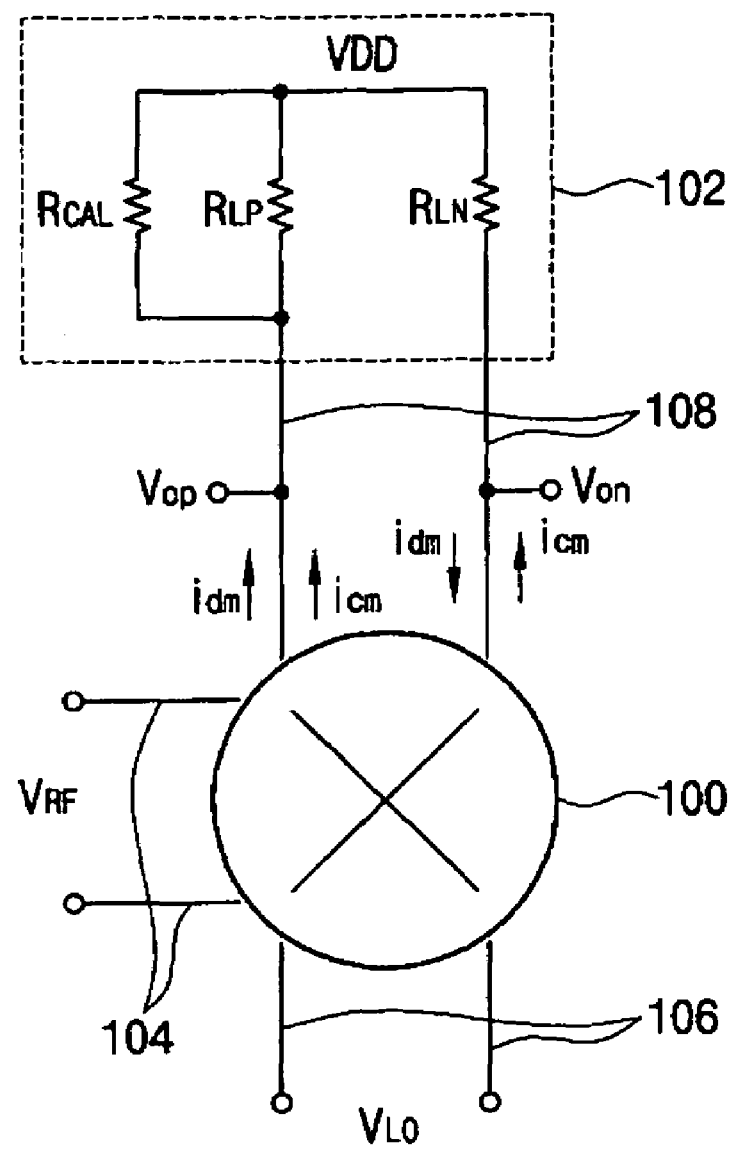
FIG. 1 is a circuit diagram illustrating a direct conversion receiver circuit including a conventional second order intercept point (IP2) calibration circuit.
Figure 2:
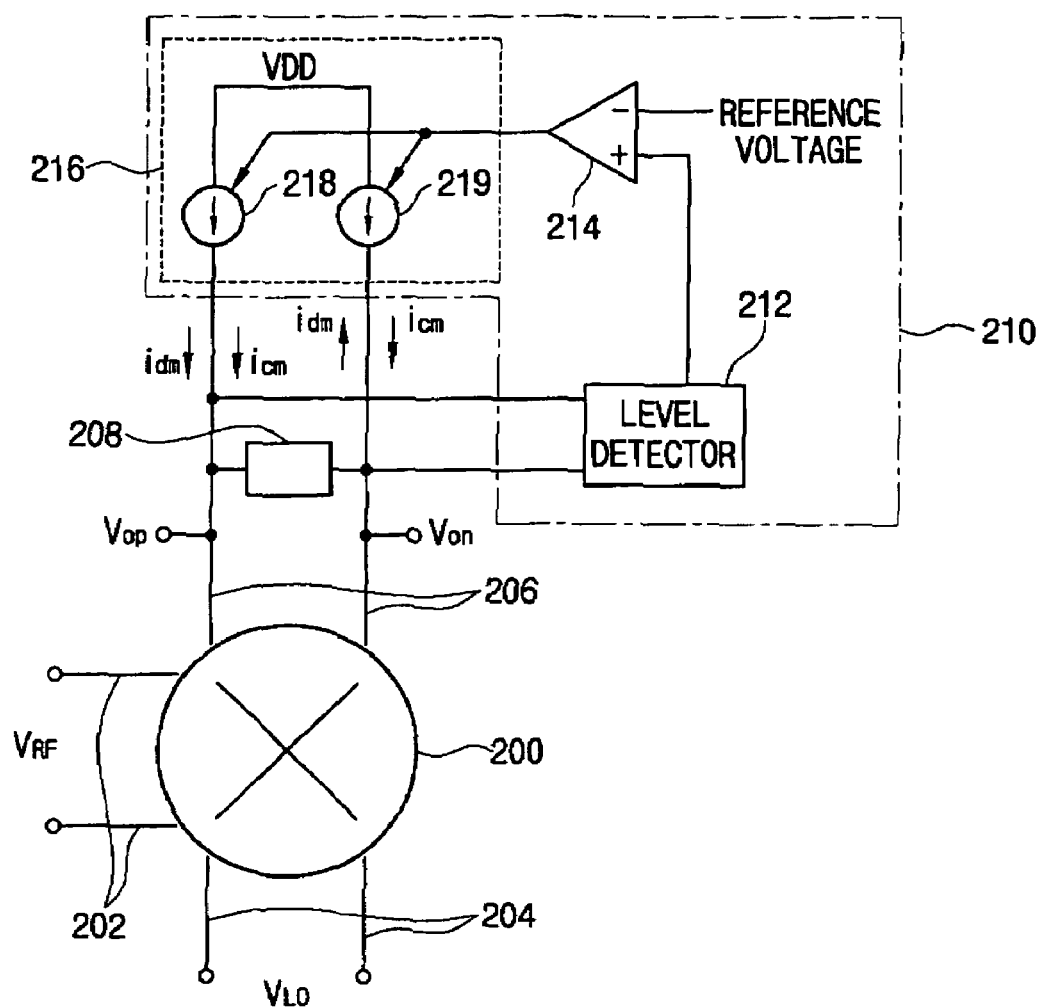
FIG. 2 is a block diagram illustrating a direct conversion receiver circuit including a second order intercept point (IP2) calibration circuit according to an exemplary embodiment of the present invention.

FIG. 2 is a block diagram illustrating a direct conversion receiver circuit including a second order intercept point (IP2) calibration circuit according to an exemplary embodiment of the present invention. The IP2 calibration circuit calibrates the second order intercept point (IP2) to control the second order intermodulation (IM2).

Referring to FIG. 2, the IP2 calibration circuit of the present invention includes a load impedance 208 and a common mode feedback circuit 210. In the direct conversion receiver circuit, the load impedance 208 and the common mode feedback circuit 210 are operatively connected to the output terminals 206 of a mixer 200.

The mixer 200 directly converts a carrier signal $V_{RF}$ to a baseband is signal. Accordingly, the mixer 200 has a first pair of input terminals 202 for receiving the carrier signal $V_{RF}$ and a second pair of input terminals 204 for receiving a local oscillation signal $V_{LO}$. The mixer 200 is employed in a direct conversion and outputs a useful signal representing the frequency difference between the carrier signal $V_{RF}$ and the local oscillation signal $V_{LO}$. The output signal of the mixer 200 is output to a pair of output terminals 206. The pair of output terminals 206 includes a first output terminal for outputting a $V_{op}$ voltage and a second output terminal for outputting a $V_{on}$ voltage, and the output signal of the mixer 200 a differential output.

The load impedance 208 is disposed between the pair of output terminals 206 of the mixer 200, and is used to sense a small signal at the output signal of the mixer 200. Particularly, the load impedance 208 is disposed between the first terminal and the second terminal of the output terminals 206. Since an output signal of the mixer 200 for use in a direct conversion is output to the drain terminals of transistors (see, e.g., FIG. 3), a load resistance of load impedance 208 is coupled between the drain terminals thereof.

The common mode feedback circuit 210 includes a level detector 212, an amplifier 214 and a current source 216.

The level detector 212 detects the $V_{op}$ and $V_{on}$ voltages, (which are differential output signals of the mixer 200), and outputs a detector output signal to the amplifier 214. The detector output signal may have voltage level the same scale as the $V_{op}$ and $V_{on}$ voltages, or may have a transformed level, a quantized voltage level, or may be a transformed phase of the $V_{op}$ and $V_{on}$ voltages. In any such case, characteristic of the detected $V_{op}$ and $V_{on}$ voltages are transmitted to the amplifier 214.

The amplifier 214 amplifies a voltage difference between common mode levels of the characteristic of the detected $V_{op}$ and $V_{on}$ and a reference voltage. The output voltage of the amplifier 214 controls the current source unit 216.

The current source unit 216 includes a first current source 218 and a second source 219. Output currents of the first and second current sources 218 and 219 are both controlled by the output voltage of the amplifier 214. The output currents $i_{cm}$ and $i_{dm}$ (of the first and second current sources 218 and 219, through the mixer 200) generate a predetermined common mode voltage and a differential mode voltage across an output impedance and the load impedance 208.

Due to the above-described elements, a predetermined gain is produced in the common mode feedback circuit 210. The gain of the common mode feedback circuit 210 is controlled by a voltage or a current of the amplifier 214 and of the current source unit 216.

A total second order intermodulation (IM2) output voltage VIM2 is represented by a sum of the common mode IM2 output voltage $V_{IM2,cm}$ an and a differential mode IM2 output voltage $V_{IM2,dm}$. The differential mode IM2 output voltage $V_{IM2,dm}$ is given by the following expression 4:

<Expression 4>

$V_{IM2,dm} = i_{dm}R_L$, where the load impedance is assumed to have only a resistance $R_L$, and $i_{dm}$ denotes a differential current.

The common mode IM2 output voltage $V_{IM2,cm}$ is given by the following expression 5:

$$V_{IM2,cm} = i_{cm}\left(\frac{Z_o + \Delta Z}{1 + G_{cm} + \Delta G} + \frac{R_L}{2}\right) - \qquad \text{<Expression 5>}$$
$$i_{cm}\left(\frac{Z_o - \Delta Z}{1 + G_{cm} - \Delta G} + \frac{R_L}{2}\right)$$
$$= 2i_{cm}\frac{\Delta Z(1 + G_{cm}) - Z_o \Delta G}{(1 + G_{cm} + \Delta G)(1 + G_{cm} - \Delta G)}$$

, where $i_{cm}$ denotes a common mode current, $Z_0+\Delta Z$ denotes an output impedance of the first current source 218, and $Z_0-\Delta Z$ denotes an output impedance of the second current source 219. In addition, $G_{cm}+\Delta G$ denotes a gain of the $V_{op}$ voltage, which is a differential output voltage of the mixer 200, and $G_{cm}-\Delta G$ denotes a gain of $V_{on}$, which is another differential output voltage of the mixer 200.

Therefore, the total IM2 output voltage VIM2 is given by the following expression 6:

$$V_{IM2} = V_{IM2,cm} + V_{IM2,dm} \qquad \text{<Expression 6>}$$
$$= i_{dm}R_L + 2i_{cm}\frac{\Delta Z(1 + G_{cm}) - Z_o \Delta G}{(1 + G_{cm} + \Delta G)(1 + G_{cm} - \Delta G)}.$$

In the above-mentioned expression 6, the IM2 output voltage VIM2 may be reduced by adjusting a common mode loop gain, i.e. a gain of the common mode feedback circuit 210, thereby increasing the second order intercept point IP2 (and reducing the second order intermodulation distortion so that linearity may be secured in a communication system including embodiments of the present invention).

Figure 3A:
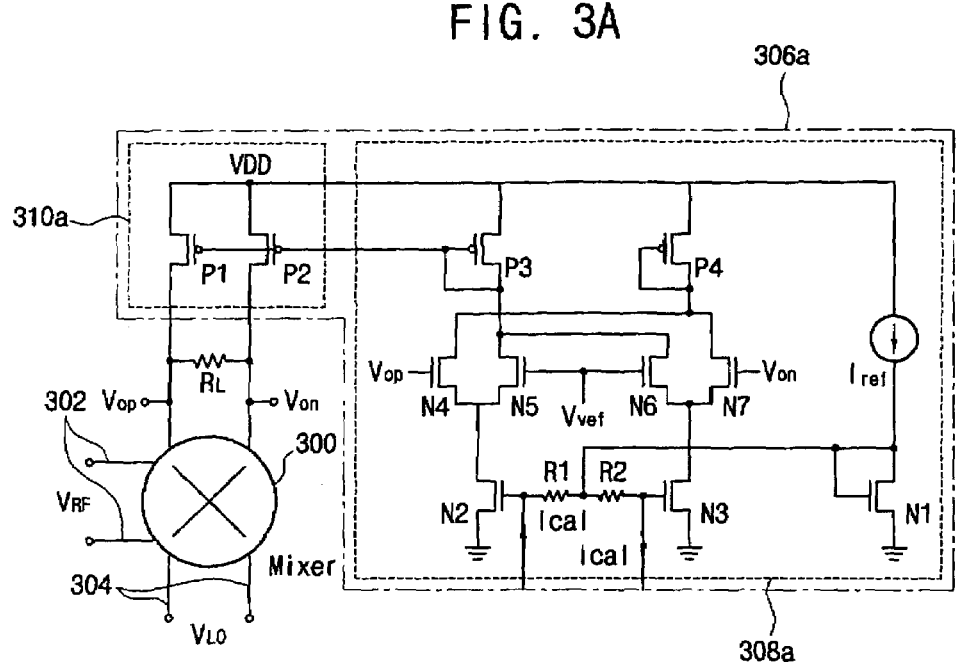
FIGS. 3A and 3B are circuit diagrams illustrating a direct conversion receiver circuit including IP2 calibration circuits that control an IM2 output voltage by adjusting the gain of differential amplifiers, according to other exemplary embodiments of the present invention.
Figure 3B:
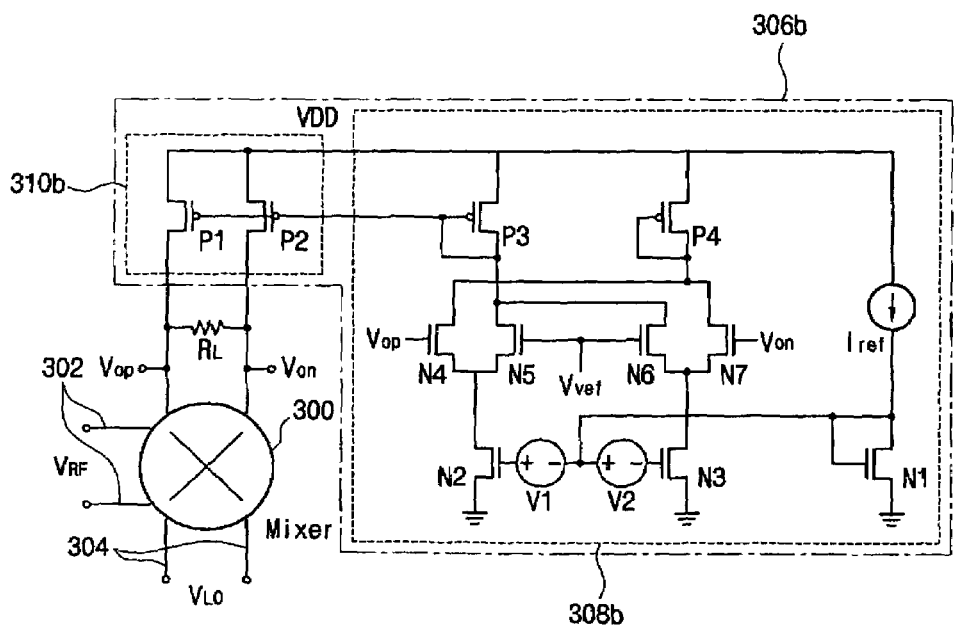

FIGS. 3A and 3B are circuit diagrams illustrating direct conversion receiver circuits including IP2 calibration circuits that control IM2 output voltage by adjusting the gain of an amplifier, according to other exemplary embodiments of the present invention.

In FIG. 3A the structure of the IP2 calibration circuit is similar to that of the IP2 calibration circuit shown in FIG. 2. In the IP2 calibration circuit of FIG. 3A, a resistor RL is used as a load impedance (208 of FIG. 2). The gain of the amplifier, and the IM2 output voltage level in the IP2 calibration circuit of FIG. 3A are controlled by a resistance.

Referring to FIG. 3A, the mixer 300 is used for a direct conversion. The mixer 300 includes a first pair of input terminals 302 for receiving a carrier signal $V_{RF}$ and a second pair of input terminals 304 for receiving a local oscillation signal $V_{LO}$. The input terminals 302 and 304 function the same as 202 and 204 of FIG. 2.

The mixer 300 (for use in a direct conversion receiver) outputs signal(s) having a frequency (or frequencies) corresponding to a frequency difference between the carrier signal $V_{RF}$ and the local oscillation signal $V_{LO}$. The output signal of the mixer 300 is output to a pair of output terminals $V_{op}$ and $V_{on}$. The pair of output terminals $V_{op}$ and $V_{on}$ includes a first output terminal for outputting the $V_{op}$ voltage and a second output terminal for outputting the $V_{on}$ voltage, and the output signal of the mixer 300 is in a form of a differential output.

The load impedance RL is disposed between the pair of output terminals ($V_{op}$ and $V_{on}$) of the mixer 300, and controls a small signal gain of the output signal of the mixer 300.

An amplifier 308a of the common mode feedback circuit 306a includes two differential amplifiers and a bias circuit.

The two differential amplifiers include a first differential amplifier and a second differential amplifier. The first differential amplifier includes first differential pair transistors, a first active load and a first DC current source.

The first differential pair transistors include a transistor N4 and a transistor N5. The $V_{op}$ voltage detected by the level detector 212 is applied to a gate of the transistor N4, and a reference voltage VREF is applied to a gate of the transistor N5. A source of the transistor N4 and a source of the transistor N5 are coupled together to the first DC current source (e.g., N2).

The first DC current source includes a transistor N2 whose source is connected to a ground (or a VSS) terminal, and whose drain is connected to the common source of the first differential pair (N4 and N5).

The active load includes a diode-connected transistor P3 whose gate and drain are coupled together and operable as an active load to the output signals of the first differential pair (N4 and N5) and second differential pair (N6 and N7) of transistors. In addition, the transistor P3 transmits small signal output voltages of the first and second differential pairs to two current sources P1 and P2.

The second differential pair transistors include a transistor N6 and a transistor N7. The $V_{on}$ voltage detected by the level detector 212 is applied to a gate of the transistor N7, and a reference voltage VREF is applied to a gate of the transistor N6. A source of the transistor N6 and a source of the transistor N7 are coupled together to the second DC current source (e.g., N3).

The second DC current source includes a transistor N3 whose source is connected to a ground (or a VSS) terminal, and whose drain is connected to the common source of the second differential pair transistors (N6 and N7).

The detected $V_{op}$ and $V_{on}$ voltages, which are applied to gate terminals of the transistor N4 and transistor N7 respectively, are the same or are representative of the output signals $V_{op}$ and $V_{on}$ of the mixer 300. The output signals $V_{op}$ and $V_{on}$ of the mixer 300 may be detected using an impedance circuit, such as a resistor, an inductor and/or a capacitor. Also, the output signals $V_{op}$ and $V_{on}$ of the mixer 300 may be detected by directly connecting the output terminals $V_{op}$ and $V_{on}$ of the mixer 300 to the gates of the transistors N4 and N7.

A bias circuit includes a reference current source Iref and a diode-connected transistor N1. The reference current source Iref is disposed between VDD and the drain of the transistor N1. The transistor N1 is connected between the reference current source Iref and a ground (VSS) terminal. A gate and a drain of the transistor N1 are connected to each other, thereby effectively forming a diode. In addition, the drain (and gate) of transistor N1 is connected to a gate of the transistor N2 via a resistor R1, and is connected to a gate of the transistor N3 via a resistor R2.

A current source unit 310a has a transistor P1 as a first current source and a transistor P2 as a second current source.

The transistor P1 has a source terminal connected to a VDD and a lo drain terminal connected to a first output terminal of the mixer 300. In addition, a gate of the transistor P1 is connected to the drain (and gate) of the transistor P3, which is an active load.

The transistor P2 has a source terminal connected to a VDD and a drain terminal connected to a second output terminal of the mixer 300. In addition, a gate of the transistor P2 is connected to the drain (and gate) of the transistor P3, which is an active load, and is commonly connected to a gate of the transistor P1. In other words, gates of the transistor P1 and transistor P2 are connected in common to the drain (and gate) of the transistor P3.

Due to the above-mentioned structure, a predetermined gain results in the common mode feedback circuit 306a. In addition, the gain of the common mode feedback circuit 306a varies with the current Ical flowing through resistors R1 and R2, wherein resistors R1 and R2 are disposed between the gates of the transistors N2 and N3. In other words, a predetermined voltage difference between the gate voltage of the transistor N2 and the gate voltage of the transistor N3 is generated by the current $I_{cal}$ flowing through the resistors R1 and R2, thereby generating a DC current difference between the DC current through the transistor N2 and the DC current through the transistor N3.

Since a voltage gain of a differential amplifier is proportional to a transconductance of a transistor in the differential amplifier and the transconductance depends upon a DC bias current, the voltage difference between the gate voltages of the transistor N2 and of the transistor N3 results in the ΔG described in the description of FIG. 2.

FIG. 3B is a circuit diagram illustrating an IP calibration circuit for controlling a gain of the amplifier and the IM2 output voltage by utilizing a voltage source.

In FIG. 3B, the structure of the IP2 calibration circuit of FIG. 3B is similar to the IP2 calibration circuit of FIG. 3A except that a voltage source V1 and a voltage source V2 are disposed between the transistor N2 and the transistor N3, (in place of the resistors R1 and R2 of FIG. 3A). A voltage difference V1+V2 is established between the gates of the transistor N2 and the transistor N3.

Accordingly, a DC current difference (comparing the current through transistors N2 and the N3) corresponding to the voltage difference (V1+V2) is produced, and the amplifier 308b including first and second differential amplifiers has a gain difference caused by the DC current difference. The common mode feedback circuit 306b may have a common mode gain difference corresponding to ΔG caused by the gain difference of the amplifier 308b.

Figure 4A:
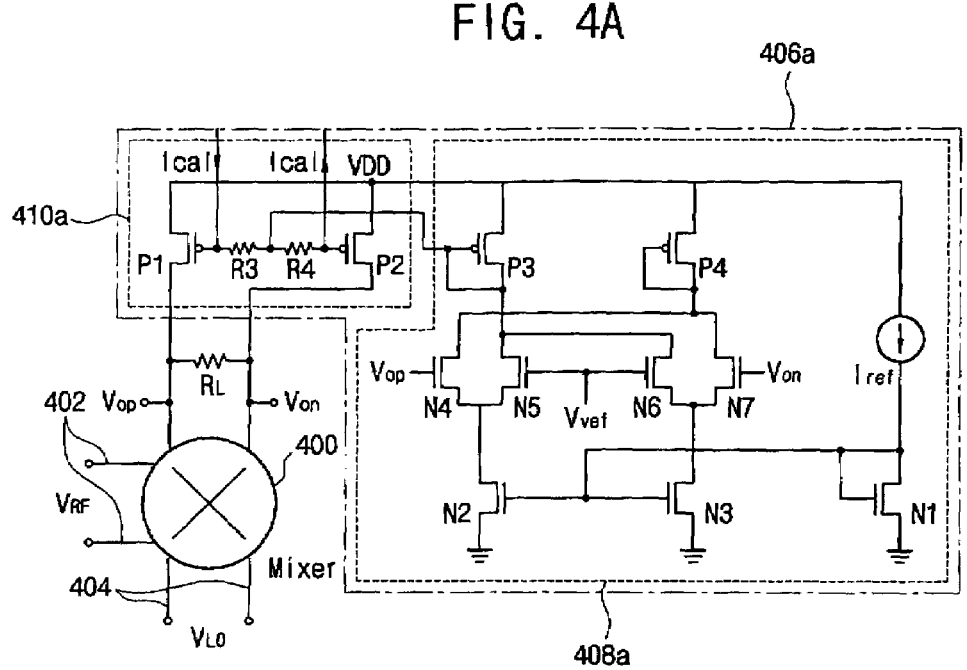
FIGS. 4A and 4B are circuit diagrams illustrating a direct conversion receiver circuit including IP2 calibration circuits that control an IM2 output voltage by adjusting the gain of current sources, according to additional exemplary embodiments of the present invention.
Figure 4B:
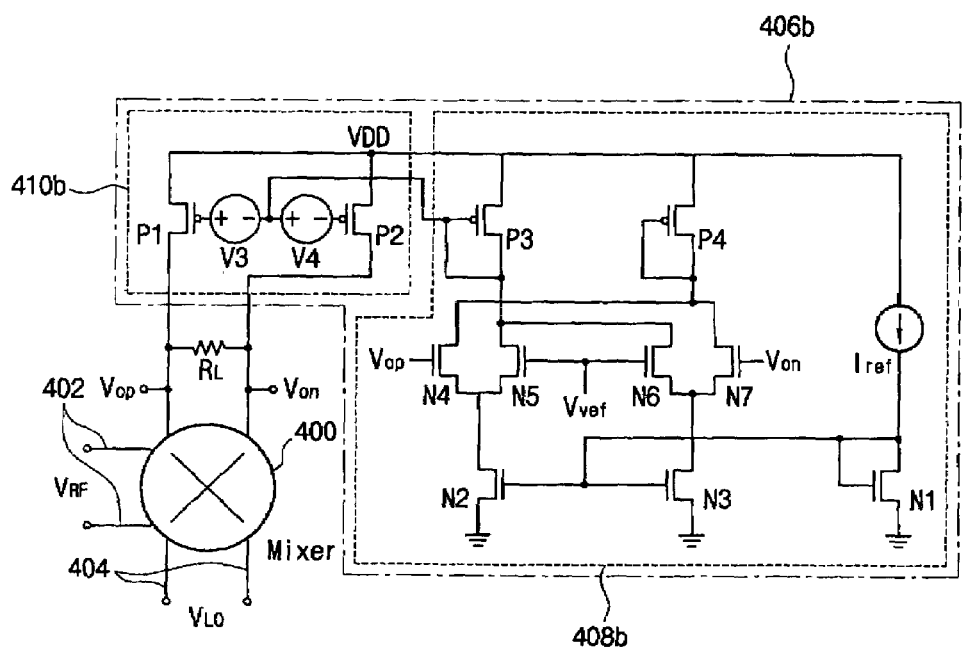

FIGS. 4A and 4B are circuit diagrams are circuit diagrams illustrating direct conversion receiver circuits including IP2 calibration circuits that controls an IM2 output voltage by adjusting a gain of a current source according to another exemplary embodiment of the present invention.

FIG. 4A illustrates an IP2 calibration circuit for controlling an IM2 output voltage by controlling the gain of a current source using a resistance, according to an exemplary embodiment of the present invention.

The IP2 calibration circuit of FIG. 4A is similar to the IP2 calibration circuits of diagrams of FIGS. 3A and 3B except for the different distribution of biasing resistors between a DC current source unit 410a and an amplifier 408a.

The current source unit 410a has a transistor P1 as a first current source, and a transistor P2 as a second current source. In addition, resistors R3 and R4 are serially connected between gates of the transistors P1 and P2, and a current Ical flows through the resistors R3 and R4. The current $I_{cal}$ produces a voltage difference between the gate voltages of the transistors P1 and P2.

A large signal current of the transistor P1 is generated by the gate-to-source voltage thereof, and a large signal current of the transistor P2 is also generated by the gate-to-source voltage thereof. The transistors in the above exemplary embodiment of the present invention are assumed to operate in their active region.

The large signal currents of the respective transistors P1 and P2 differ from each other due to a voltage difference between the gate voltages of the transistors P1 and P2. The current difference between the large signal currents causes a transconductance difference between the respective transistors P1 and P2, thereby resulting in a small signal gain (gm) difference. The small signal gain difference affects the gain of the common mode feedback circuit 406a.

The biasing connections of transistors N2 and N3, which are DC current sources of the amplifier 408a, have a structure different from the connection structures shown in FIGS. 3A and 3B. Referring to FIG. 4A, a gate of the transistor N2 and a gate of the transistor N3 are coupled directly together, and neither resistors nor voltage sources are disposed between them. Therefore, a bias voltage (determined by a transistor N1 included in the bias circuit) is equally applied to gate terminals of the transistors N2 and N3. Due to the equal bias voltages applied to gate terminals of the transistors N2 and N3, a first DC current through the transistor N2 is substantially equal to a second DC current through the transistor N3.

During operation of the common mode feedback circuit 406a, when the $V_{op}$ and $V_{on}$ voltages increase, a current flowing through a transistor N4 and a current flowing through a transistor N7 increase. The amount of currents through transistors N5 and N6 decreases due to the increased amount of the currents through the transistors N4 and N7. The gate voltage of the transistor P3 is decreased due to the decreased currents through the transistors N5 and N6. The decreased gate voltage of the transistor P3 causes a decrease in the large signal current of the current source unit 410a. The decreased large signal current of the current source unit 410a causes a decrease in the transconductance of transistors P1 and P2 in the current source unit 410a, thereby decreasing the $V_{op}$ and $V_{on}$ voltage. In other words, the common mode feedback circuit 406a employs a negative feedback, both to stabilize the system of the IP2 calibration circuit and to obtain a stable gain.

FIG. 4B is a circuit diagram illustrating an IP2 calibration circuit that controls an IM2 output voltage by controlling the gain of a current source and using voltage sources for biasing according to another exemplary embodiment of the present invention.

Referring to FIG. 4B, the IP2 calibration circuit of FIG. 4B is similar to the IP2 calibration circuit of FIGS. 3A and 3B except the distribution of biasing voltage sources between the current source unit 410b and an amplifier 408b.

The current source unit 410b has a transistor P1 as a first current source, and a transistor P2 as a second current source. A first voltage source V3 and a second voltage source V4 are serially connected between the gates of the transistors P1 and P2. Thus, a voltage difference is generated between the gate voltages of the transistors P1 and P2 by the voltage sources V3 and V4. A first large signal current of the transistor P1 is generated due to the voltage difference between the gate and the source thereof, and a second large signal current of the transistor P2 is also generated due to voltage difference between the gate and the source thereof.

A difference in the first and second large signal currents of the respective transistors P1 and P2 is caused by a voltage difference between gate voltages of the transistors P1 and P2. The difference between the large signal currents causes a transconductance difference between the respective transistors P1 and P2, thereby resulting in a small signal gain difference of the transistors P1 and P2. The small signal gain difference affects the gain of the common mode feedback circuit 406b.

In addition, biasing connections of transistors N2 and N3, which are DC current sources of the amplifier 408b, are different from the biasing connections of transistors N2 and N3 shown in FIGS. 3A and 3B in that the gate of the transistor N2 and the gate of the transistor N3 are coupled directly together without any resistors or voltage sources between them. Therefore, a bias voltage (wherein the bias voltage is determined by the transistor N1 in the bias circuit) is applied equally to the gate terminals of the transistors N2 and N3. By the equal applied bias voltage, a first DC current through the transistor N2 is substantially equal to a second DC current through the transistor N3.

According to the present invention, a gain of the common mode feedback circuit is controlled to reduce the second order intermodulation distortion.

Having thus described exemplary embodiments of the present invention, it is to be understood that the invention defined by the appended is claims is not to be limited by particular details set forth in the above description as many apparent variations thereof are possible without departing from the spirit or scope thereof as hereinafter claimed.

What is claimed is:

1. A circuit for reducing a second order intermodulation, the circuit comprising:
a feedback circuit configured to control the second order intermodulation of a mixer by adjusting the gain of the feedback circuit;
wherein the feedback circuit includes:
a first differential amplifier configured to amplify the difference between a first voltage at the first output terminal of the mixer and a reference voltage; and
a second differential amplifier configured to amplify the difference between a second voltage at the second output terminal of the mixer and the reference voltage.

2. The circuit of claim 1, further comprising a load resistance connected between the first output terminal and the second output terminal of the mixer, wherein the load resistance is operatively connected between an input terminal of the first differential amplifier and an input terminal of the second differential amplifier within the feedback circuit.

3. The circuit of claim 1, wherein the mixer is configured to perform a direct conversion.

4. The circuit of claim 1, wherein the feedback circuit further includes:
a current source unit configured to provide at least one current that is controlled by an output voltage of an amplifier unit including the first differential amplifier and the second differential amplifier.

5. A circuit for reducing a second order intermodulation, the circuit comprising:
a load resistance for connection between the first output terminal and the second output terminal of a mixer;
a common mode feedback circuit configured to control the second order intermodulation of a mixer having a first output terminal and a second output terminal by detecting at least one output voltage of the mixer and by adjusting the gain of the common mode feedback circuit;
wherein the common mode feedback circuit includes:
a first differential amplifier configured to amplify the difference between a first voltage at the first output terminal of the mixer and a reference voltage; and
a second differential amplifier configured to amplify the difference between
a second voltage at the second output terminal of the mixer and the reference voltage;
wherein the load resistance is operatively connected between an input terminal of the first differential amplifier and an input terminal of the second differential amplifier within the common mode feedback circuit.

6. The circuit of claim 5, wherein each of the first and second differential amplifiers includes a diode-connected transistor.

7. The circuit of claim 5, wherein the common mode feedback circuit further includes;
a first current source for providing a first current to the first output terminal of the mixer; and
a second current source for providing a second current to the second output terminal of the mixer.

8. The circuit of claim 7, wherein first current source is a first field effect transistor and the second current source is a second field effect transistor.

9. The circuit of claim 8, wherein the source terminal of the first current source and the source terminal of the second current source are coupled together, thereby forming a common source configuration.

10. The circuit of claim 5, wherein a gain of the common mode feedback circuit is based on the gain of the first differential amplifier and the gain of the second differential amplifier.

11. The circuit of claim 5, wherein the first differential amplifier includes a first DC current source, and a first bias current through the first DC current source is adjusted so as to control the gain of the first differential amplifier.

12. The circuit of claim 11, wherein the first bias current is controlled by a first bias voltage between a gate and a source of the first DC current source.

13. The circuit of claim 12, wherein the first bias voltage between the gate and the source of the first DC current source is established by calibration current through a resistance connected to the gate of first DC current source.

14. The circuit of claim 11, wherein the second differential amplifier includes a second DC current source, and a second bias current through the second DC current source is adjusted so as to control the gain of the second differential amplifier.

15. The circuit of claim 14, wherein the second bias current is controlled by a second bias voltage between a gate and a source of the second DC current source.

16. The circuit of claim 7, wherein a gain of the common mode feedback circuit is controlled by a gain of the first current source and a gain of the second current source.

17. The circuit of claim 10, wherein the gain of the first current source and the gain of the second current source are controlled by a voltage difference between a first gate voltage of the first current source and a second gate voltage of the second current source.

18. A circuit for reducing a second order intermodulation, the circuit comprising:
a feedback circuit including:
a first differential amplifier configured to amplify the difference between a first voltage at a first output terminal of the mixer and a reference voltage; and a second differential amplifier configured to amplify the difference between a second voltage at a second output terminal of the mixer and the reference voltage;

a first current source, controlled by an output voltage of the feedback unit, for providing a first current to the first output terminal of a mixer;

a second current source, controlled by the output voltage of the feedback unit, for providing a second current to the second output terminal of the mixer.

19. The circuit of claim 18, further comprising:

a load resistance for connection between the first output terminal and the second output terminal of the mixer, wherein the load resistance is operatively connected between an input terminal of the first differential amplifier and an input terminal of the second differential amplifier.

20. The circuit of claim 19, wherein:

the first differential amplifier includes a first DC current source and the second differential amplifier includes a second DC current source;

a first bias current through the first DC current source is adjusted so as to control the gain of the first differential amplifier; and a second bias current through the second DC current source is adjusted so as to control the gain of the second differential amplifier.

* * * * *